(12) United States Patent
Bosetti et al.

(10) Patent No.: US 9,006,502 B2
(45) Date of Patent: Apr. 14, 2015

(54) PROCESS FOR THE PRODUCTION OF BIO-OIL FROM SOLID URBAN WASTE

(75) Inventors: Aldo Bosetti, Vercelli (IT); Daniele Bianchi, Arese (IT); Giuliana Franzosi, Novara (IT); Marco Ricci, Novara (IT)

(73) Assignee: ENI S.p.A., Rome (IT)

( * ) Notice: Subject to any disclaimer, the term of this patent is extended or adjusted under 35 U.S.C. 154(b) by 326 days.

(21) Appl. No.: 13/395,028

(22) PCT Filed: Sep. 1, 2010

(86) PCT No.: PCT/IB2010/002176
§ 371 (c)(1),
(2), (4) Date: Mar. 8, 2012

(87) PCT Pub. No.: WO2011/030196
PCT Pub. Date: Mar. 17, 2011

(65) Prior Publication Data
US 2012/0172642 A1    Jul. 5, 2012

(30) Foreign Application Priority Data
Sep. 9, 2009    (IT) ............................... MI2009A1550

(51) Int. Cl.
*C12P 5/00*        (2006.01)
*C12P 39/00*    (2006.01)
(Continued)

(52) U.S. Cl.
CPC    *C10G 1/04* (2013.01); *C10G 1/002* (2013.01); *C10G 1/02* (2013.01); *C10G 2300/1003* (2013.01); *C10G 2300/1011* (2013.01)

(58) Field of Classification Search
USPC .......................................................... 585/14
See application file for complete search history.

(56) References Cited

U.S. PATENT DOCUMENTS 3,864,096 A    2/1975    Urban
4,145,188 A *  3/1979    Espenscheid et al. ........ 585/240

(Continued)

FOREIGN PATENT DOCUMENTS

CN    1417290 A    5/2003
CN    101490269 A    7/2009

(Continued)

OTHER PUBLICATIONS

International Search Report Issued Jan. 31, 2011 in PCT/IB10/02176 Filed Sep. 1, 2010.

(Continued)

*Primary Examiner* — Ellen McAvoy
(74) *Attorney, Agent, or Firm* — Oblon, McClelland, Maier & Neustadt, L.L.P.

(57) ABSTRACT

A process for the production of bio-oil from solid urban waste, comprising the following steps: a) subjecting said solid urban waste to liquefaction, obtaining a mixture including an oily phase consisting of bio-oil, a solid phase and an aqueous phase; b) subjecting the aqueous phase obtained in the liquefaction step a) to fermentation, obtaining a fermented biomass; c) feeding the fermented biomass obtained in the fermentation step b) to the liquefaction step a). The bio-oil (or bio-crude) thus obtained can be advantageously used in the production of biofuels which can be used as such or mixed with other motor vehicle fuels. Alternatively, this bio-oil (or bio-crude) can be used as such (biocombustible) or mixed with fossil combustibles (combustible oil, coal, etc.) for the generation of electric energy or heat.

24 Claims, 1 Drawing Sheet

Figure 1:
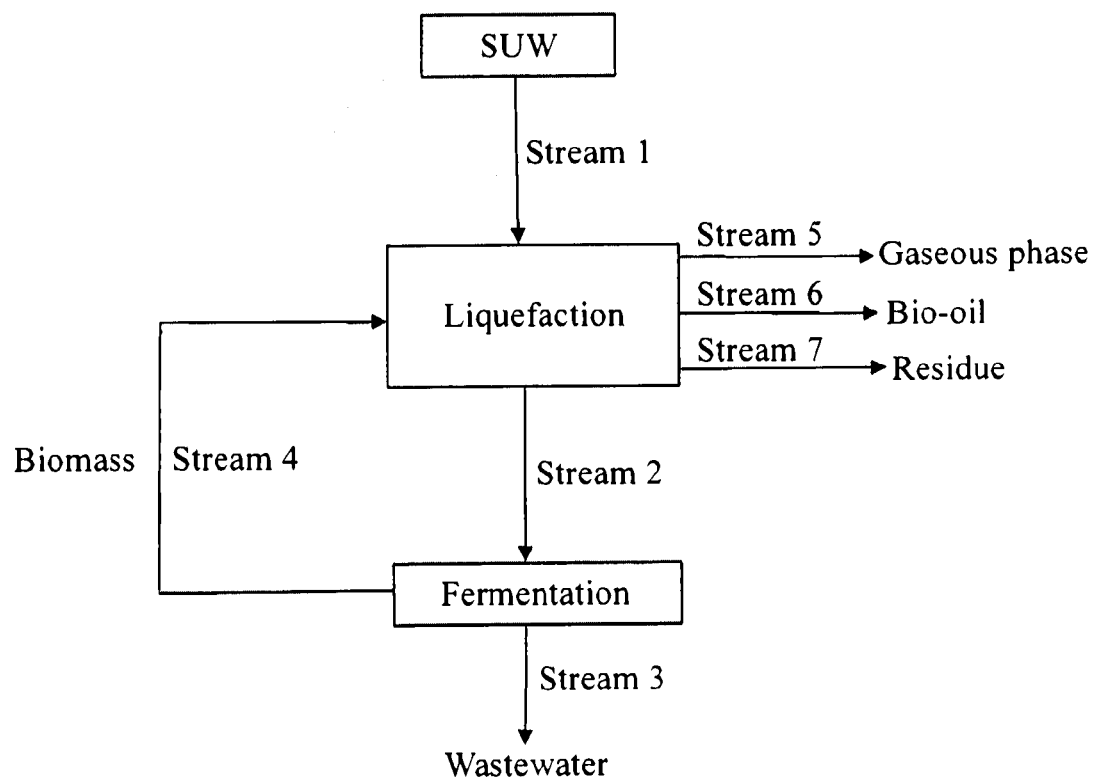

(51) Int. Cl.
*C10G 1/04* (2006.01)
*C10G 1/00* (2006.01)
*C10G 1/02* (2006.01)

(56) References Cited

U.S. PATENT DOCUMENTS

| | | | |
|---|---|---|---|
| 4,346,000 A | | 8/1982 | Van Drooge |
| 5,009,672 A | * | 4/1991 | Ruffo et al. .................... 44/593 |
| 5,207,911 A | * | 5/1993 | Pellegrin et al. ............. 210/603 |
| 5,429,645 A | * | 7/1995 | Benson et al. ................. 44/589 |
| 5,821,111 A | * | 10/1998 | Grady et al. .............. 435/252.5 |
| 7,262,331 B2 | * | 8/2007 | van de Beld et al. ......... 585/240 |
| 8,091,492 B2 | * | 1/2012 | Zanotta ......................... 110/342 |
| 8,409,823 B2 | * | 4/2013 | Bellussi et al. ................. 435/42 |
| 8,563,282 B2 | * | 10/2013 | Galvez et al. ................. 435/161 |
| 2007/0122874 A1 | * | 5/2007 | Suthantharajan et al. ... 435/41 |
| 2009/0082604 A1 | | 3/2009 | Agrawal et al. |
| 2010/0105127 A1 | * | 4/2010 | Ginsburg ..................... 435/262 |
| 2011/0252696 A1 | * | 10/2011 | Franklin et al. ................. 44/388 |
| 2011/0294175 A1 | | 12/2011 | Bellussi et al. |

FOREIGN PATENT DOCUMENTS

| | | |
|---|---|---|
| WO | WO 2004/101609 A2 | 11/2004 |
| WO | WO 2004/101609 A3 | 11/2004 |
| WO | 2004 108609 | 12/2004 |
| WO | 2009 029660 | 3/2009 |

OTHER PUBLICATIONS

Combined Office Action and Search Report issued Oct. 8, 2013 in Chinese Patent Application No. 201080039881.8 (with English language translation).

U.S. Appl. No. 13/640,910, filed Oct. 12, 2012, Bosetti, et al.

* cited by examiner

PROCESS FOR THE PRODUCTION OF BIO-OIL FROM SOLID URBAN WASTE

The present invention relates to a process for the production of bio-oil from solid urban waste (SUW).

More specifically, the present invention relates to a process for the production of bio-oil from solid urban waste (SUW) which comprises subjecting said solid urban waste to liquefaction, subjecting the aqueous phase obtained from said liquefaction to fermentation, and feeding the fermented biomass obtained from said fermentation to said liquefaction.

The bio-oil (or bio-crude) thus obtained can be advantageously used in the production of biofuels which can be used as such, or mixed with other fuels, for motor vehicles. Alternatively, said bio-oil can be used as such (biocombustible) or mixed with fossil combustibles (combustible oil, coal, etc.) for the generation of electric energy.

The use of biomasses, in particular biomasses of a vegetal origin, for energy purposes, for example as raw material for the production of biocombustibles, or components which can be added to combustibles, is known in the art. Biomass can, therefore, represent a source of renewable energy as an alternative to the traditional raw materials of a fossil origin normally used in the production of combustibles.

The use of said biomasses, however, can remove precious food resources for animal and/or human use.

Efforts have been made in the art in order to use waste and/or urban, industrial and/or agricultural residues for energy purposes.

U.S. Pat. No. 4,618,736, for example, describes a process for the production of hydrocarbons from a cellulose material comprising the steps of: forming a suspension of cellulose material in a liquid polycyclic hydrogen donor compound, said suspension containing a quantity of water equal to at least 5% by weight, but not more than about 10% by weight, with respect to the weight of the cellulose material; subjecting the suspension to a temperature higher than 200° C. and to a pressure increasing up to at least 1,000 psi, in the presence of hydrogen, in order to obtain the hydrogenation of the cellulose material and to produce a mixture of gaseous, liquid and solid hydrocarbons having an oxygen content lower than 10% by weight and a calorific value higher than 15,000 Btu/lb; separating the hydrocarbon mixture into three phases: gaseous, liquid and solid; and recovering said liquid polycyclic hydrogen donor compound from the liquid phase and recycling it to the treatment of the cellulose material. Said cellulose material can derive from household or urban waste or from vegetables. Said liquid polycyclic hydrogen donor compound is preferably tetralin.

U.S. Pat. No. 4,670,613 describes a process for producing liquids containing hydrocarbons which essentially consists in introducing a biomass into a reaction area, in the presence of water, at a pressure higher than the partial vapour pressure of the water and at a temperature of at least 300° C. and leaving said biomass in the reaction zone for more than 30 seconds; separating the solids from the fluid leaving the reaction zone and maintaining the fluid remaining in this zone in a single phase; and subsequently separating the liquids from the remaining fluid. Said biomass can be selected from a large range of biomasses of different origins, such as, for example, biomasses of a vegetal origin, biomasses deriving from agricultural waste or urban waste.

Goudriaan et al. in "Chemical Engineering Science" (1990), Vol. 45, No. 8, pages 2729-2734 describe the process known as HTU or "HydroThermal Upgrading". Said process allows biomass coming from energy crops to be converted into liquid combustible (e.g., bio-oil) which comprises treating the biomass in the presence of water, at a temperature higher than 300° C., for a time ranging from 5 minutes to 15 minutes, at a pressure of 180 bar.

U.S. Pat. No. 7,262,331 describes a process for the continuous production of hydrocarbons having an improved energy density from biomass, comprising: a first step, in which an aqueous feed containing biomass, not pre-heated or pre-heated at a temperature ranging from 50° C. to 95° C., is subjected to a treatment which comprises bringing said feed, in a single step, from a pressure of 5 bar or less, to a pressure ranging from 100 bar to 250 bar; a second step following the first step in which the temperature of the feed under pressure is increased from 95° C. or less to 180° C. or more, and the pressurized feed is maintained at a temperature not higher than 280° C. for a period of up to 60 minutes, thus forming a reaction mixture; a reaction step in which the reaction mixture is heated, for a period of up to 60 minutes to a temperature higher than 280° C. Said biomass can be selected from biomass/water mixtures coming from the aerobic or anaerobic fermentation of industrial or urban waste having a water/biomass ratio ranging from 4 to 5. Biomass deriving from agricultural waste, or household and urban biowaste having a water/biomass ratio ranging from 1 to 4, can also be used.

The above processes however can have various drawbacks.

The high temperatures and high pressures, for example, normally required for obtaining suitable yields in the process known as HTU or "Hydro Thermal Upgrading" require the use of specific equipment, normally made of special metal alloys capable of operating at these high temperatures and, in particular, at these high pressures, and a high energy consumption, with a consequent increase in the production costs.

Furthermore, by operating according to the processes described above, a part of organic material included in the biomass remains dissolved in the aqueous phase deriving from the thermal treatment of said biomass with consequent lower yield of hydrocarbons.

The Applicant has faced the problem of finding a process for the production of bio-oil from solid urban waste which allows to improve the yield of bio-oil. In particular, the Applicant has faced the problem of finding a process capable of using organic material which, as indicated above, remains dissolved in the aqueous phase deriving from the thermal treatment of said biomass.

The Applicant has now found that the production of bio-oil from solid urban waste (i.e. the conversion of biomass into usable liquid products, for example, as biocombustibles and/or biofuels), in particular from the organic fraction of solid urban waste, can be advantageously carried out by means of a process which comprises subjecting said solid urban waste to liquefaction, subjecting the aqueous phase obtained from said liquefaction to fermentation, and feeding the fermented biomass obtained from said fermentation to said liquefaction.

In particular, the Applicant has found that the possibility of using the aqueous phase containing a part of the organic material deriving from solid urban waste subjected to liquefaction, allows an increase in the yield of bio-oil.

Furthermore, the Applicant has found that said process allows to obtain a good yield of bio-oil even when operating under much mild temperature and pressure conditions with respect to those adopted in the processes described in the known art (e.g., at a temperature of 250° C. and at a pressure of 40 bar) with a consequent decrease in the production costs.

The bio-oil thus obtained can be advantageously used in the production of biofuels which can be used as such or mixed with other fuels, for motor vehicles. Or said bio-oil can be used as such (biocombustible) or mixed with fossil combustibles (combustible oil, coal, etc.) to generate electric energy or heat.

An object of the present invention therefore relates to a process for the production of bio-oil from solid urban waste comprising the following steps:
a) subjecting said solid urban waste to liquefaction obtaining a mixture including an oily phase consisting of bio-oil, a solid phase and an aqueous phase;
b) subjecting the aqueous phase obtained in the liquefaction step a) to fermentation, obtaining a fermented biomass;
c) feeding the fermented biomass obtained in the fermentation step b) to the liquefaction step a).

It should be noted that from the liquefaction of said fermented biomass, a further oily phase consisting of bio-oil is obtained, and, therefore, an increase in the yield of bio-oil.

It should also be noted that, even when operating under much mild operative temperature and pressure conditions with respect to those adopted in the processes described in the known art (e.g., at temperature of 250° C. and at a pressure of 40 bar), the additional oily phase consisting of bio-oil obtained from the liquefaction of said fermented biomass, in any case allows to obtain good bio-oil yields.

For the purposes of the present description and of the following claims, the definitions of the numerical ranges always include the extremes, unless otherwise specified.

In accordance with a preferred embodiment of the present invention, said solid urban waste can be selected, for example, from organic material deriving from differentiated waste collection, organic material selected from undifferentiated solid urban waste, or mixtures thereof; or mixtures of said organic material with pruning and mowing refuse and/or agricultural residues.

In accordance with a further preferred embodiment of the present invention, said solid urban waste can be mixed and used with other materials, such as, for example:
primary and biological sludges produced in wastewater purification plants;
residues and/or waste deriving from agricultural and/or zootechnic activities;
residues and/or waste deriving from the agricultural and food industry;
residues and/or waste deriving from agricultural processing, forestation and/or silviculture;
or mixtures thereof.

In accordance with a preferred embodiment of the present invention said solid urban waste, as such or mixed with other materials, can be treated by subjecting it to a preliminary grinding or sizing process before being subjected to liquefaction.

In accordance with a preferred embodiment of the present invention, said solid urban waste is wet. Preferably said solid urban waste can have a water content higher than or equal to 50% by weight, preferably ranging from 55% by weight to 80% by weight, with respect to the total weight of said solid urban waste.

In accordance with a preferred embodiment of the present invention, said liquefaction step (a) can be carried out at a temperature ranging from 150° C. to 350° C., preferably ranging from 200° C. to 320° C.

In accordance with a preferred embodiment of the present invention, said liquefaction step (a) can be carried out at a pressure ranging from 5 bar to 170 bar, preferably ranging from 15 bar to 115 bar.

In accordance with a preferred embodiment of the present invention, said liquefaction step (a) can be carried out for a time ranging from 5 minutes to 240 minutes, preferably ranging from 15 minutes to 90 minutes.

Said liquefaction step (a) can be carried out in reactors known in the art, for example, autoclaves.

Said liquefaction step (a) can be carried out by operating in different modes such as, for example "batchwise", or in continuous.

Considering that the thermal energy necessary in said liquefaction step (a) can be partially or totally obtained from the heat recovery or from the combustion of traditional energy vectors, for example, methane gas, LPG, mineral oil, coal, etc., it is not excluded that the thermal energy can come from other renewable sources such as, for example solar, or biomasses.

The oily phase, the solid phase and the aqueous phase included in the mixture obtained in said step (a), can be separated by techniques known in the art such as, for example, gravitational separation (e.g., sedimentation, decantation), filtration, centrifugation. Said phases are preferably separated by gravitational separation.

During said liquefaction step (a) a gaseous phase is also formed, equal to about 10% by weight-25% by weight with respect to the weight (dry weight) of said solid urban waste. Said gaseous phase is mainly composed of carbon dioxide (about 80% in moles-95% in moles) and a mixture of hydrocarbons having from 1 to 4 carbon atoms or of other gases (about 10% in moles to 20% in moles). Said gaseous phase, after separation, separation which can be carried out for example by depressurizing the pressurized vessel in which said liquefaction step (a) is carried out, before sending the mixture obtained (oily phase+solid phase+aqueous phase) from said liquefaction step (a) to separation, is generally sent for further treatment in order to upgrade its combustible organic component.

The solid phase obtained after separation generally comprises ashes and inert products. Said solid phase can be used, for example, as inorganic starting material in the building industry, or in the ceramics industry.

The aqueous phase obtained after separation comprises part of the organic material included in said solid urban waste. Said aqueous phase can generally have a content of organic material higher than or equal to 25% by weight, preferably ranging from 30% by weight to 50% by weight, with respect to the total weight of the dry fraction of said solid urban waste.

According to a preferred embodiment of the present invention, said fermentation step (b) can be carried out in the presence of at least one oleaginous yeast.

According to a preferred embodiment of the present invention, said oleaginous yeast can be selected from: *Rhodotorula glutinis, Rhodotorula gracilis, Rhodotorula graminis, Lypomices starkeyi, Lypomices lipofer, Trigonopsis variabilis, Candida kefyr, Candida curvata, Candida lipolytica, Torulopsis* sp., *Pichia stipitis, Criptococcus albidus, Criptococcus* sp., or mixtures thereof.

According to a preferred embodiment of the present invention, said fermentation step (b) can be carried out in the presence of at least one microbial consortium isolated from the aqueous phase obtained in said liquefaction step (a). For this purpose, the aqueous phase deriving from said liquefaction step (a) is kept under stirring, in air, for 10 days, at room temperature (25° C.).

According to a preferred embodiment of the present invention, said fermentation step (b) can be carried out at a temperature ranging from 20° C. to 40° C., preferably ranging from 25° C. to 35° C.

According to a preferred embodiment of the present invention, said fermentation step (b) can be carried out for a time ranging from 10 hrs to 120 hrs, preferably ranging from 24 hrs to 100 hrs.

According to a preferred embodiment of the present invention, said fermentation step (b) can be carried out at a pH ranging from 4.5 to 7.5, preferably ranging from 5 to 7. In order to maintain the pH within the desired ranges, an aqueous solution of at least one inorganic base such as, for example, sodium hydroxide, potassium hydroxide, calcium hydroxide, magnesium hydroxide, or mixtures thereof, can be added to the culture medium used for the fermentation, in such a quantity as to obtain the desired pH.

Said fermentation step (b) can be carried out operating in different modes such as, for example, batchwise (fed-batch fermentation), or in continuous. Before being used in said fermentation step (b), said oleaginous yeast can preferably be cultivated in a culture medium known in the art such as, for example, YEPG, Nutrient Broth.

Said fermentation step (b) can be advantageously carried out in fermenters known in the art.

In order to concentrate the yeast cells in the fermented biomass obtained in said fermentation step (b), said fermented biomass, before being fed to the liquefaction step (a), can be subjected to a thickening treatment.

According to a preferred embodiment of the present invention, at the end of said fermentation step (b), said fermented biomass, before being fed to said liquefaction step (a), can be subjected to a thickening treatment. In this phase, the concentration of the yeast cells is brought to values ranging from 5% by weight to 50% by weight, preferably from 15% by weight to 30% by weight, with respect to the total weight (dry weight) of the fermented biomass. Said thickening can be carried out by means of techniques known in the art such as, for example, sedimentation, decantation, flocculation, filtration, and the like.

After thickening, the fermented biomass is fed to the above liquefaction step (a).

A wastewater is also obtained from said thickening, which can be optionally cooled to a temperature ranging from room temperature (25° C.) to 50° C., and sent to a subsequent treatment such as, for example, aerobic or anaerobic biological treatment.

As already mentioned above, a further oily phase is obtained from the liquefaction of said fermented biomass, consisting of bio-oil which will be added to the oily phase consisting of bio-oil obtained from the liquefaction of said solid urban waste.

A further solid phase, a further aqueous phase and a further gaseous phase are also obtained from the liquefaction of said fermented biomass, which will be added to the solid phase, aqueous phase and gaseous phase respectively obtained by the liquefaction of said solid urban waste.

The process, object of the present invention allows bio-oil to be produced with an overall yield ranging from 15% to 50%, said yield being calculated with respect to the weight of the dry fraction of the initial solid urban waste (SUW).

It should be noted that the process object of the present invention, thanks to the use of the aqueous phase deriving from the liquefaction step (a), allows an increase in the yield of bio-oil to be obtained, with respect to the liquefaction step (a) alone, ranging from 5% to 30%, said increase in the yield being calculated with respect to the weight of the dry fraction of the initial solid urban waste (SUW).

The bio-oil obtained by means of said process can be sent to the subsequent processing phases in order to transform it, for example, into biofuel by means of treatment known in the art such as, for example, hydrogenation or cracking.

The present invention will now be illustrated through an illustrative embodiment with reference to FIG. 1 provided hereunder.

According to a typical embodiment of the process object of the present invention, the solid urban waste (SUW) (Stream 1) is subjected to liquefaction obtaining a mixture (not represented in FIG. 1) comprising three phases: an oily phase consisting of bio-oil, a solid phase (i.e. residue) and an aqueous phase. Said mixture is sent to a phase separation section (not represented in FIG. 1) in order to separate the above three phases obtaining: an oily phase consisting of bio-oil (Stream 6), a solid phase (i.e. residue) (Stream 7) comprising ashes, inert products, and an aqueous phase (Stream 2).

Said aqueous phase (Stream 2) is subjected to fermentation in the presence of an oleaginous yeast (e.g., *Rhodotorula graminis* DBVPG 4620), or of a microbial consortium isolated from an aqueous phase deriving from the liquefaction step (a) as described above.

At the end of the fermentation, a fermented biomass is obtained, which is subjected to a thickening treatment (not represented in FIG. 1) in order to concentrate the cells of said oleaginous yeast in said fermented biomass in order to obtain concentration values preferably ranging from 5% by weight to 30% by weight with respect to the total weight (dry weight) of said fermented biomass. A wastewater (Stream 3) is also obtained from said thickening treatment which can be sent to a subsequent treatment such as, for example, aerobic or anaerobic biological treatment (not represented in FIG. 1).

At the end of the thickening treatment, the fermented biomass (Stream 4) is fed to the liquefaction together with the solid urban waste. The further oily phase consisting of bio-oil obtained from the liquefaction of said fermented biomass will be recovered in (Stream 6).

A further solid phase, a further aqueous phase and a further gaseous phase are also obtained from the liquefaction of said fermented biomass, which will be recovered in (Stream 7), (Stream 2) and (Stream 5) respectively.

During the liquefaction, a gaseous stream (Stream 5) is also produced, comprising $CO_2$, gaseous hydrocarbons having from 1 to 4 carbon atoms, or other gases, which can be separated, for example, by depressurization of the pressurized vessel in which said liquefaction is carried out, before sending the mixture (oily phase+solid phase+aqueous phase) obtained after liquefaction to the phase separation section. The gaseous phase thus obtained (Stream 7) can be sent for further treatment in order to upgrade its combustible organic component.

The bio-oil thus obtained can be sent to subsequent processing phases to be transformed, for example, into biofuel by means of hydrogenation or cracking treatments, for example (not represented in FIG. 1)

Some illustrative and non-limiting examples are provided hereunder for a better understanding of the present invention and for its embodiment.

EXAMPLE 1

Comparative 500 g of a wet organic fraction of solid urban waste (SUW) are fed, with a suitable dosage system, into a stirred 1 liter autoclave. The dry weight of this fraction proves to be equal to 25% by weight (125 g).

After creating an inert atmosphere inside the autoclave by washings with nitrogen, the autoclave is rapidly heated in order to reach the internal temperature of 310° C. It is kept under stirring, under these conditions, for 1 hour, observing that the pressure inside the autoclave reaches the maximum pressure of 110 bar.

The autoclave is then rapidly cooled up to 80° C. and the gaseous phase is separated. Said gaseous phase is analyzed separately by gaschromatographic techniques, and proves to be equal to 22.5 g (18% by weight of the dry fraction of the initial SUW). The analysis showed that 90% of the gaseous phase consists of, carbon dioxide.

The reaction mixture thus obtained is separated, under heating, in a gravitational separator obtaining three phases:
  an oily phase consisting of bio-oil which, once anhydrified, proves to be equal to 43.7 g (35% by weight of the dry fraction of the initial SUW);
  a solid phase consisting of a solid residue equal to 18.8 g (15% by weight of the dry fraction of the initial SUW);
  an aqueous phase equal to 415 g having a SUW content equal to 40.0 g (32% by weight of the dry fraction of the initial SUW).

EXAMPLE 2

The same procedure is adopted as in Example 1, but the aqueous phase equal to 415 g is used totally and without any dilution as growth medium in the subsequent fermentation step: yeast extract only is added at a concentration of 1 g/l as vitamin source and the pH is adjusted to a value of 6.5 by means of the addition of an aqueous solution of potassium hydroxide (KOH) 0.1 M. The aqueous phase is subsequently fed to a fermenter having a working volume of 1 liter and inoculated with a strain of *Rhodotorula graminis* DBVPG 4620 previously grown in a YEPG yeast medium (inoculum equal to 2.5 g/l—dry weight).

The fermentation is carried out at a temperature of 30° C. and with a stirring equal to 170 rpm. After 48 hours of fermentation, the fermented biomass is recovered by centrifugation (5,000 rpm, for 30 minutes) obtaining 45 g of wet fermented biomass containing 20% by weight of cells (dry weight equal to 9.0 g).

The fermented biomass thus obtained is fed to the same stirred 1 liter autoclave of Example 1, together with 500 g of an organic fraction of solid urban waste (SUW): the liquefaction is carried out under the same operating conditions of Example 1. After analogous separation, treatment, a further 3.1 g of bio-oil are thus obtained, which in total lead to the formation of 46.8 g of bio-oil with an increase in the bio-oil yield equal to 7.1%.

EXAMPLE 3

500 g of a wet organic fraction of solid urban waste (SUW) are fed, with a suitable dosage system, into a stirred 1 liter autoclave. The dry weight of this fraction proves to be equal to 25% by weight (125 g).

After creating an inert atmosphere inside the autoclave by washings with nitrogen, the autoclave is rapidly heated in order to reach the internal temperature of 310° C. It is kept under stirring, under these conditions, for 1 hour, observing that the pressure inside the autoclave reaches the maximum pressure of 110 bar.

The autoclave is then rapidly cooled up to 80° C. and the gaseous phase is separated. Said gaseous phase is analyzed separately by gaschromatographic techniques, and proves to be equal to 22.5 g (18% by weight of the dry fraction of the initial SUW). The analysis showed that 90% of the gaseous phase consists of carbon dioxide.

The reaction mixture thus obtained is separated, under heating, in a gravitational separator obtaining three phases:
  an oily phase consisting of bio-oil which, once anhydrified, proves to be equal to 42.0 g (33.6% by weight of the dry fraction of the initial SUW);
  a solid phase consisting of a solid residue equal to 18.7 g (15% by weight of the dry fraction of the initial SUW);
  an aqueous phase equal to 417 g having a SUW content equal to 41.7 g (32% by weight of the dry fraction of the initial SUW)

The above aqueous phase is used totally and without any dilution as growth medium in the subsequent fermentation step: yeast extract only is added at a concentration of 1 g/l as vitamin source and the pH is adjusted to a value of 6.5 by means of the addition of an aqueous solution of potassium hydroxide (KOH) 0.1 M. The aqueous phase is subsequently fed to a fermenter having a working volume of 1 liter and inoculated with a microbial consortium isolated from an aqueous phase coming from the liquefaction treatment of the SUW described above, maintained under stirring, in air, at room temperature (25° C.), for 10 days. Before being used as inoculum, the isolated microbial consortium was transferred to an agarized medium for bacteria, of the type Nutrient Agar and used as inoculum after growth on a medium of the Nutrient Broth type (inoculum equal to 2.5 g/l—dry weight).

The fermentation is carried out at a temperature of 30° C. and with a stirring equal to 170 rpm. After 70 hours of fermentation, the biomass is recovered by centrifugation (5,000 rpm for 30 minutes) obtaining 59.5 g of wet biomass containing 20% by weight of cells (dry weight equal to 11.9 g).

The fermented biomass thus obtained is fed to the above stirred 1 liter autoclave, together with 500 g of an organic fraction of solid urban waste (SUW): the liquefaction is carried out under the same operating conditions described above. After analogous separation treatment, a further 4.2 g of bio-oil are thus obtained, which in total lead to the formation of 46.2 g of bio-oil with an increase in the bio-oil yield equal to 10%.

EXAMPLE 4

500 g of a wet organic fraction of solid urban waste (SUW) are fed, with a suitable dosage system, into a stirred 1 liter autoclave. The dry weight of this fraction proves to be equal to 25% by weight (125 g).

After creating an inert atmosphere inside the autoclave by washings with nitrogen, the autoclave is rapidly heated in order to reach the internal temperature of 250° C. It is kept under stirring, under these conditions, for 4 hours, observing that the pressure inside the autoclave reaches the maximum pressure of 42 bar.

The autoclave is then rapidly cooled up to 80° C. and the gaseous phase is separated. Said gaseous phase is analyzed separately by gaschromatographic techniques, and proves to be equal to about 20.0 g (16% by weight of the dry fraction of the initial SUW). The analysis showed that 91% of the gaseous phase consists of carbon dioxide.

The reaction mixture thus obtained is separated, under heating, in a gravitational separator obtaining three phases:
  an oily phase consisting of bio-oil which, once anhydrified, proves to be equal to 40.0 g (32% by weight of the dry fraction of the initial SUW);
  a solid phase consisting of a solid residue equal to 18.7 g (15% by weight of the dry fraction of the initial SUW);
  an aqueous phase equal to 421 g having a SUW content equal to 46.3 g (37% by weight of the dry fraction of the initial SUW)

The above aqueous phase is used totally and without any dilution as growth medium in the subsequent fermentation step: yeast extract only is added at a concentration of 1 g/l as vitamin source and the pH is adjusted to a value of 6.5 by means of the addition of an aqueous solution of potassium hydroxide (KOH) 0.1 M. The aqueous phase is subsequently fed to a fermenter having a working volume of 1 liter and inoculated with a microbial consortium isolated from an aqueous phase coming from the liquefaction treatment of the SUW described above, maintained under stirring, in air, at room temperature (25° C.), for 10 days. Before being used as inoculum, the isolated microbial consortium was transferred to an agarized medium for bacteria, of the type Nutrient Agar and used as inoculum after growth on a medium of the Nutrient Broth type (inoculum equal to 2.5 g/l—dry weight).

The fermentation is carried out at a temperature of 30° C. and with a stirring equal to 170 rpm. After 70 hours of fermentation, the biomass is recovered by centrifugation (5,000 rpm for 30 minutes) obtaining 81.1 g of wet biomass containing 20% by weight of cells (dry weight equal to 16.2 g).

The fermented biomass thus obtained is fed to the above stirred 1 liter autoclave, together with 500 g of an organic fraction of solid urban waste (SUW): the liquefaction is carried out under the same operating conditions described above. After analogous separation treatment, a further 5.4 g of bio-oil are thus obtained, which in total lead to the formation of 45.4 g of bio-oil with an increase in the bio-oil yield equal to 13.5%.

The invention claimed is:

1. A process for producing bio-oil from solid urban waste, the process comprising:
    a) liquefying the solid urban waste, to obtain a mixture comprising a solid phase, an aqueous phase, and an oily phase, the oily phase consisting of bio-oil;
    b) fermenting the aqueous phase in the presence of at least one oleaginous yeast or in the presence of a microbial consortium isolated from the aqueous phase, to obtain a fermented biomass;
    c) feeding the fermented biomass to liquefying step a) to obtain a further mixture comprising a solid phase, an aqueous phase, and an oily phase, the oily phase consisting of bio-oil; and
    d) recovering the bio-oil from said mixture produced in c).

2. The process of claim 1, wherein the solid urban waste comprises organic material, the organic material is organic material derived from differentiated waste collection, the organic material is organic material from undifferentiated solid urban waste, or the organic material is a mixture thereof, and the organic material is optionally mixed with pruning and mowing refuse, agricultural residue, or both.

3. The process of claim 2, further comprising mixing the solid urban waste prior to liquefying, with:
    a primary and biological sludge produced in a wastewater purification plant;
    a residue, a waste, or both, derived from agricultural activity, zootechnic activity, or both;
    a residue, a waste or both, derived from agricultural and food industry;
    a residue, a waste or both, derived from agricultural processing, forestation, sylviculture, or a combination thereof;
    or a combination thereof.

4. The process of claim 1, further comprising:
    preliminarily grinding or sizing the solid urban waste before liquefying it.

5. The process of claim 1, wherein the solid urban waste has a water content higher than or equal to 50% by weight with respect to a total weight of the solid urban waste.

6. The process of claim 5, wherein the solid urban waste has a water content from 55% by weight to 80% by weight with respect to a total weight of the solid urban waste.

7. The process of claim 1, wherein the liquefying is at a temperature of from 150° C. to 350° C.

8. The process of claim 7, wherein the liquefying is at a temperature of from 200° C. to 320° C.

9. The process of claim 1, wherein the liquefying is at a pressure of from 5 bar to 170 bar.

10. The process of claim 9, wherein the liquefying is at a pressure of from 15 bar to 115 bar.

11. The process of claim 1, wherein the liquefying is for a time of from 5 minutes to 240 minutes.

12. The process of claim 11, wherein the liquefying is for a time of from 15 minutes to 90 minutes.

13. The process of claim 1, further comprising:
    separating the oily phase, the solid phase, and the aqueous phase gravitational separation, filtration, centrifugation, or a combination thereof.

14. The process of claim 1, wherein fermenting the aqueous phase is in the presence of an oleaginous yeast.

15. The process of claim 14, wherein the oleaginous yeast is *Rhodotorula glutinis, Rhodotorula gracilis, Rhodotorula graminis, Lypomices starkeyi, Lypomices lipofer, Trigonopsis variabilis, Candida kefyr, Candida curvata, Candida lipolytica, Torulopsis* sp., *Pichia stipitis, Criptococcus albidus, Criptococcus* sp., or a mixture thereof.

16. The process of claim 1, wherein fermenting the aqueous phase is in the presence of a microbial consortium isolated from the aqueous phase.

17. The process of claim 1, wherein fermenting the aqueous phase is at a temperature of from 20° C. to 40° C.

18. The process of claim 17, wherein fermenting the aqueous phase is at a temperature of from 25° C. to 35° C.

19. The process of claim 1, wherein fermenting the aqueous phase is for a time of from 10 to 120 hours.

20. The process of claim 19, wherein fermenting the aqueous phase is for a time of from 24 hours to 100 hours.

21. The process of claim 1, wherein fermenting the aqueous phase is at a pH of from 4.5 to 7.5.

22. The process of claim 21, wherein fermenting the aqueous phase is at a pH of from 5 to 7.

23. The process of claim 1, further comprising:
    thickening the fermented biomass before feeding it to the liquefying of a).

24. A bio-oil obtained by a process comprising the process of claim 1.

* * * * *